US012123960B2

(12) United States Patent
Okano et al.

(10) Patent No.: US 12,123,960 B2
(45) Date of Patent: Oct. 22, 2024

(54) POSITION LOCATING SYSTEM, POSITION LOCATING METHOD, AND POSITION LOCATING PROGRAM

(71) Applicant: TOYOTA JIDOSHA KABUSHIKI KAISHA, Aichi-ken (JP)

(72) Inventors: Takahiro Okano, Chiryu (JP); Takaaki Yanagihashi, Toyota (JP); Hiroaki Kiyokami, Nisshin (JP); Toru Takashima, Susono (JP); Kenta Miyahara, Okazaki (JP); Yohei Tanigawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 387 days.

(21) Appl. No.: 17/503,368

(22) Filed: Oct. 18, 2021

(65) Prior Publication Data

US 2022/0128709 A1 Apr. 28, 2022

(30) Foreign Application Priority Data

Oct. 23, 2020 (JP) ................... 2020-178433

(51) Int. Cl.
*G01S 13/34* (2006.01)
*G01S 19/07* (2010.01)
(Continued)

(52) U.S. Cl.
CPC ............ *G01S 19/42* (2013.01); *G01S 19/073* (2019.08); *G06T 5/50* (2013.01); *G06T 7/70* (2017.01);
(Continued)

(58) Field of Classification Search
CPC ......... G01S 19/42; G01S 19/073; G06T 7/70; G06T 5/50; H04W 4/029
(Continued)

(56) References Cited

U.S. PATENT DOCUMENTS 11,153,503 B1 * 10/2021 Ebrahimi Afrouzi .. H04N 23/74
2008/0019564 A1 1/2008 Murata et al.
(Continued)

FOREIGN PATENT DOCUMENTS

CN 104819723 A * 8/2015 ............ G01C 21/30
JP 2000310540 A 11/2000
(Continued)

OTHER PUBLICATIONS

Collier, Environment classification for indoor/outdoor robotic mapping, 2009 Canadian Conference on Computer and Robot Vision, 2009, IEEE, 8pp.
(Continued)

*Primary Examiner* — Harry K Liu
(74) *Attorney, Agent, or Firm* — HAUPTMAN HAM, LLP

(57) ABSTRACT

A position locating system for locating a current position of a mobile terminal includes an imaging section, an image acquisition section, a matching section, and a position locating section. The imaging section is configured to capture a surroundings image of surroundings of the mobile terminal using a camera provided at the mobile terminal. The image acquisition section is configured to acquire over a network images similar to the surroundings image and associated with position information regarding an imaging location. The matching section is configured to perform image matching between the surroundings image and the images acquired by the image acquisition section so as to find a single image that is a match for the surroundings image. The position locating section is configured to locate the current position of the mobile terminal from the position information associated with the single image.

14 Claims, 14 Drawing Sheets

(51) Int. Cl.
*G01S 19/42* (2010.01)
*G06T 5/50* (2006.01)
*G06T 7/70* (2017.01)
*H04W 4/029* (2018.01)

(52) U.S. Cl.
CPC ... *H04W 4/029* (2018.02); *G06T 2207/30252* (2013.01)

(58) Field of Classification Search
USPC .......................................................... 342/352
See application file for complete search history.

(56) References Cited

U.S. PATENT DOCUMENTS

| | | |
|---|---|---|
| 2012/0155775 A1 | 6/2012 | Ahn et al. |
| 2018/0150972 A1 | 5/2018 | Zhu |
| 2020/0082179 A1 | 3/2020 | Sugie et al. |
| 2020/0230820 A1 | 7/2020 | Watanabe et al. |
| 2021/0082143 A1 | 3/2021 | Lee |
| 2022/0128709 A1 | 4/2022 | Okano et al. |
| 2022/0130054 A1 | 4/2022 | Okano et al. |

FOREIGN PATENT DOCUMENTS

| | | |
|---|---|---|
| JP | 200281951 A | 3/2002 |
| JP | 2004266636 A | 9/2004 |
| JP | 2006148432 A | 6/2006 |
| JP | 2007-094743 A | 4/2007 |
| JP | 2008-083777 A | 4/2008 |
| JP | 2009-110249 A | 5/2009 |
| JP | 2010-091356 A | 4/2010 |
| JP | 2010-282393 A | 12/2010 |
| JP | 2019-003606 A | 1/2019 |
| WO | 2006/001129 A1 | 1/2006 |
| WO | 2019/130945 A1 | 7/2019 |
| WO | 2019/187816 A1 | 10/2019 |

OTHER PUBLICATIONS

Office Action in U.S. Appl. No. 17/503,365, mailed Feb. 29, 2024, 35pp.
Office Action in U.S. Appl. No. 17/503,365, mailed Jun. 5, 2024, 22pp.

* cited by examiner

POSITION LOCATING SYSTEM, POSITION LOCATING METHOD, AND POSITION LOCATING PROGRAM

CROSS-REFERENCE TO RELATED APPLICATION

This application is based on and claims priority under 35 USC 119 from Japanese Patent Application No. 2020-178433 filed on Oct. 23, 2020, the disclosure of which is incorporated by reference herein.

BACKGROUND

Technical Field

The present disclosure relates to a position locating system, a position locating method, and a position locating program for locating a current position of a mobile terminal.

Related Art

An automobile navigation system disclosed in Japanese Patent Application Laid-Open (JP-A) No. 2000-310540 includes a GPS device, a dead reckoning navigation means, and a matching means. The GPS device employs radio waves from global positioning system (GPS) satellites, these being manmade satellites, to derive an absolute position of a vehicle. The dead reckoning navigation means uses a direction sensor and a distance sensor to derive a travel course and derive a relative position of the vehicle. The matching means compares the travel course against road patterns in map data to derive a position on the map data. The navigation system also includes map data, a receiver, an ego vehicle position confirmation means, and a route guidance means. The map data specifies regions where radio waves from manmade satellites cannot be received or specific regions that are not covered by the map data. The receiver receives radio waves used for position detection from a transmitter installed at a predetermined position in a specific region. The ego vehicle position identification means identifies the position of the ego vehicle based on a reception status of the radio waves used for position detection and the installation position of the transmitter. The route guidance means performs route guidance based on dead reckoning navigation and map matching according to the specified region map data, taking the confirmed position of the ego vehicle as a reference. Thus, the position of the ego vehicle is accurately identified and route guidance is provided even in regions that cannot be reached by radio waves from GPS satellites, and in the specific regions that are not covered in the map data.

SUMMARY

In the above related art, it is necessary to install dedicated transmitters at predetermined positions in the specific regions that cannot be reached by radio waves (what are referred to as GPS signals) from GPS satellites. Locations where the above-described effects can be obtained are limited as a result.

In consideration of the above circumstances, the present disclosure obtains a position locating system, a position locating method, and a position locating program capable of securing accurate position locating in regions that cannot be reached by GPS signals, without the need to install dedicated transmitters.

A first aspect of the present disclosure is a position locating system for locating a current position of a mobile terminal. The position locating system includes an imaging section configured to capture a surroundings image of surroundings of the mobile terminal using a camera provided at the mobile terminal, an image acquisition section configured to acquire over a network images similar to the surroundings image and associated with position information regarding an imaging location, a matching section configured to perform image matching between the surroundings image and the images acquired by the image acquisition section so as to find a single image that is a match for the surroundings image, and a position locating section configured to locate the current position from the position information associated with the single image.

The position locating system of the first aspect locates the current position of the mobile terminal. In this position locating system, the imaging section captures the surroundings image of the surroundings of the mobile terminal using the camera provided at the mobile terminal. The image acquisition section acquires over the network images similar to the surroundings image and associated with position information regarding an imaging location. The matching section performs image matching between the surroundings image and the images acquired by the image acquisition section so as to find a single image that is a match for the surroundings image. The position locating section then locates the current position of the mobile terminal from the position information associated with the single image found by the matching section. This enables the current position to be located without employing radio waves from a dedicated transmitter, thereby enabling accurate position locating to be secured in regions that cannot be reached by GPS signals, without the need to install dedicated transmitters.

A position locating system of a second aspect of the present disclosure is the first aspect, further including a region prediction section configured to employ a signal reception history of a GPS device provided at the mobile terminal to predict a region that has potential to include the current position in a case in which the GPS device has transitioned from an in-range state for GPS satellite signal reception to an out-of-range state for GPS satellite signal reception, wherein the image acquisition section is configured to acquire, over the network, an image associated with position information within the region predicted by the region prediction section.

According to the position locating system of the second aspect, the region prediction section employs the GPS signal reception history of the GPS device provided at the mobile terminal to predict the region that has the potential to include the current position of the mobile terminal in a case in which the GPS device has transitioned from the in-range state for GPS signal reception to the out-of-range state for GPS signal reception. The image acquisition section acquires over the network an image associated with position information within the region predicted by the region prediction section. Performing prediction in this manner limits the target range in which the image acquisition section searches for images over the network, thereby improving image acquisition efficiency.

A position locating system of a third aspect of the present disclosure is the first aspect, wherein the mobile terminal includes a user interface enabling a user of the mobile terminal to input position information, and the image acquisition section is configured to acquire over the network images associated with the position information input to the user interface.

In the position locating system of the third aspect, for example when in a region that cannot be reached by GPS signals, the user of the mobile terminal is able to input position information through the user interface of the mobile terminal. This position information may for example be approximate information regarding the current position (such as the name of the general area) as known by the user. The image acquisition section acquires over the network images associated with the position information input through the user interface. This limits the target range in which the image acquisition section searches for images over the network, thereby improving image acquisition efficiency.

A position locating system of a fourth aspect of the present disclosure is the first aspect, wherein the mobile terminal is installed to a vehicle or a robot, and the imaging section is configured to perform imaging in a state in which a GPS device provided at the mobile terminal is in an out-of-range state for GPS satellite signal reception.

In the position locating system of the fourth aspect, the mobile terminal is installed to a vehicle or a robot. In a case in which the GPS device provided at the mobile terminal is in the out-of-range state for GPS signal reception, the imaging section captures a surroundings image of the surroundings of the vehicle of the robot using the camera of the mobile terminal. Image matching is then performed as described previously, and the current position of the mobile terminal is located based on the results thereof. This enables the current position to be located automatically.

A position locating system of a fifth aspect of the present disclosure is the first aspect, wherein the camera is installed to the mobile terminal, and the imaging section is configured to perform imaging in response to user operation of the mobile terminal.

In the position locating system of the fifth aspect, the camera is installed to the mobile terminal. For example, when in a region that cannot be reached by GPS signals, the user of the mobile terminal may perform an operation to cause the imaging section to capture the surroundings image of the surroundings of the mobile terminal using the camera. Image matching is then performed as described previously, and the current position of the mobile terminal is located based on the results thereof. This enables the current position to be located as required by the user of the mobile terminal.

A sixth aspect of the present disclosure is a position locating method for locating a current position of a mobile terminal. The position locating method includes capturing a surroundings image of surroundings of the mobile terminal using a camera provided at the mobile terminal, acquiring over a network images similar to the surroundings image and associated with position information regarding an imaging location, performing image matching between the surroundings image and the acquired images so as to find a single image that is a match for the surroundings image, and locating the current position from the position information associated with the single image.

The position locating method of the sixth aspect is used to locate the current position of the mobile terminal. In this position locating method, the camera provided at the mobile terminal captures the surroundings image of the surroundings of the mobile terminal. Images similar to the captured surroundings image and associated with position information regarding an imaging location are acquired over the network. Image matching between the surroundings image and the acquired images is performed so as to find a single image that is a match for the surroundings image. The current position of the mobile terminal is then located from the position information associated with the single image. This enables the current position to be located without employing radio waves from a dedicated transmitter, thereby enabling accurate position locating to be secured in regions that cannot be reached by GPS signals, without the need to install dedicated transmitters.

A seventh aspect of the present disclosure is a position locating program for execution by a processor in order to locate a current position of a mobile terminal. The position locating program includes capturing a surroundings image of surroundings of the mobile terminal using a camera provided at the mobile terminal, acquiring over a network images similar to the surroundings image and associated with position information regarding an imaging location, performing image matching between the surroundings image and the acquired images so as to find a single image that is a match for the surroundings image, and locating the current position from the position information associated with the single image.

The position locating program of the seventh aspect is executed by a processor in order to locate the current position of the mobile terminal. In this position locating program, the camera provided at the mobile terminal captures the surroundings image of the surroundings of the mobile terminal. Images similar to the captured surroundings image and associated with position information regarding an imaging location are acquired over the network. Image matching between the surroundings image and the acquired images is performed so as to find a single image that is a match for the surroundings image. The current position of the mobile terminal is then located from the position information associated with the single image. This enables the current position to be located without employing radio waves from a dedicated transmitter, thereby enabling accurate position locating to be secured in regions that cannot be reached by GPS signals, without the need to install dedicated transmitters.

As described above, the position locating system, position locating method, and position locating program according to the present disclosure are capable of securing accurate position locating in regions that cannot be reached by GPS signals, without the need to install dedicated transmitters.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
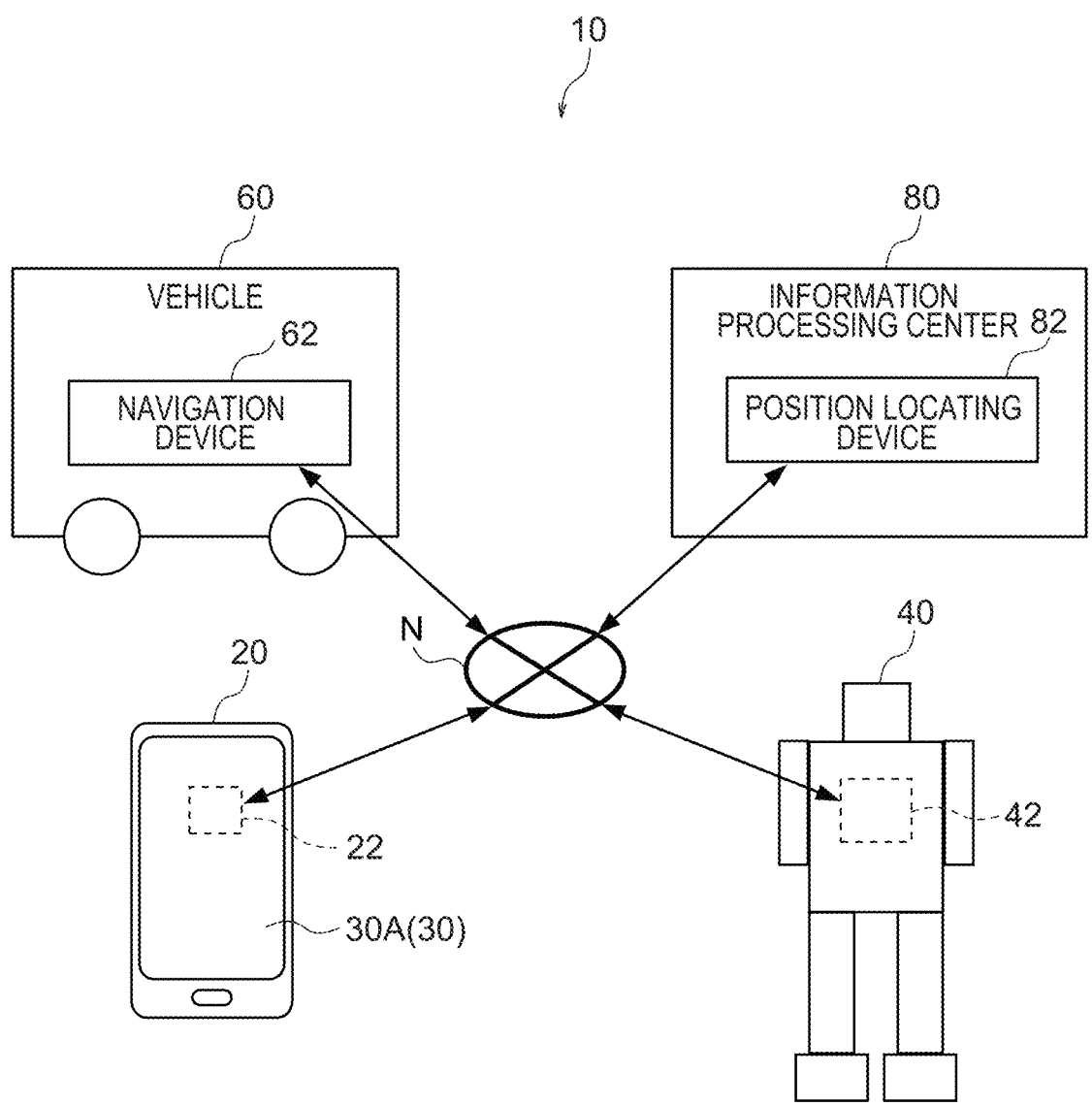
FIG. 1 is a schematic diagram illustrating a configuration of a position locating system according to a first exemplary embodiment.

Explanation follows regarding a position locating system 10 according to a first exemplary embodiment of the present disclosure, with reference to FIG. 1 to FIG. 13. The position locating system 10 according to the present exemplary embodiment is a system for implementing a position locating method in order to locate a current position of a mobile terminal when within a region that cannot be reached by GPS signals from GPS satellites. Examples of regions that cannot be reached by GPS signals include locations inside buildings, underground, in the lee of multi-story buildings, between high-rise buildings, in densely built-up areas, in densely wooded areas, in deep valleys, or beneath elevated structures, locations near to objects that generate magnetism, such as high voltage power lines, and locations near to objects that emit radio waves in the same frequency bands as GPS signals (such as 1.5 GHz cellphones). As an example, the position locating system 10 is configured by a smartphone 20, a walking robot 40, a vehicle 60, and an information processing center 80.

The smartphone 20 corresponds to a "mobile terminal" of the present disclosure. A smartphone control device 22 is installed to the smartphone 20. The walking robot 40 corresponds to a "robot" of the present disclosure, and as an example, a bipedal walking robot may be employed therefor. A robot control device 42 is installed to the walking robot 40. A navigation device 62 is installed to the vehicle 60. The robot control device 42 and the navigation device 62 each correspond to a "mobile terminal" of the present disclosure. A position locating device 82 is provided at the information processing center 80. The smartphone control device 22, the robot control device 42, the navigation device 62, and the position locating device 82 are connected so as to be capable of communicating with each other over a network N. As an example, the network N is a wired or wireless communication network employing public lines, such as the internet.

Configuration of Smartphone

Figure 2:
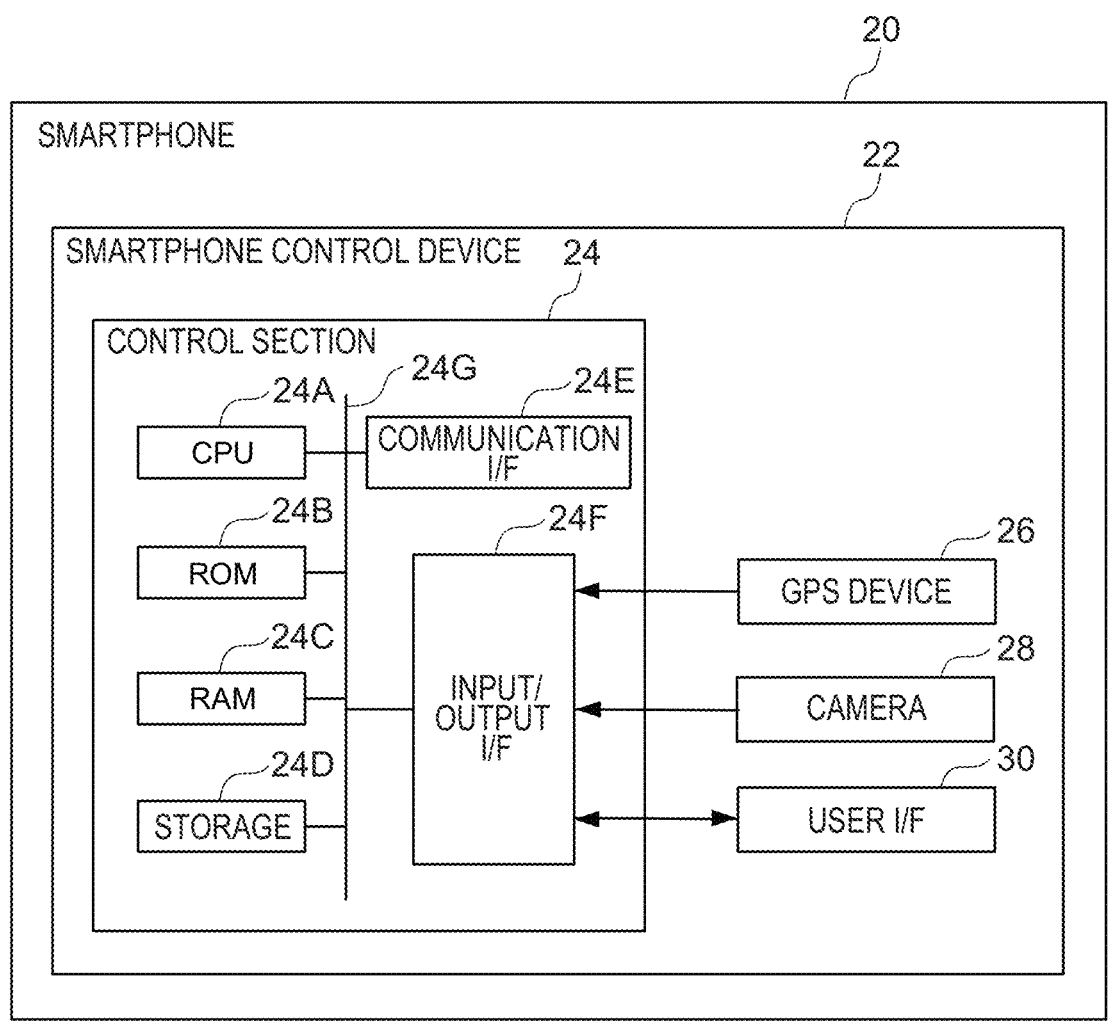
FIG. 2 is a block diagram illustrating relevant hardware configuration of a smartphone of the first exemplary embodiment.

FIG. 2 is a block diagram illustrating relevant hardware configuration of the smartphone control device 22 installed to the smartphone 20. The smartphone control device 22 includes a control section 24, a GPS device 26, a camera 28, and a user interface (I/F) 30.

The control section 24 is configured including a central processing unit (CPU) 24A, read only memory (ROM) 24B, random access memory (RAM) 24C, storage 24D, a communication I/F 24E, and an input/output I/F 24F. The CPU 24A, the ROM 24B, the RAM 24C, the storage 24D, the communication I/F 24E, and the input/output I/F 24F are connected so as to be capable of communicating with each other through a bus 24G.

Figure 3:
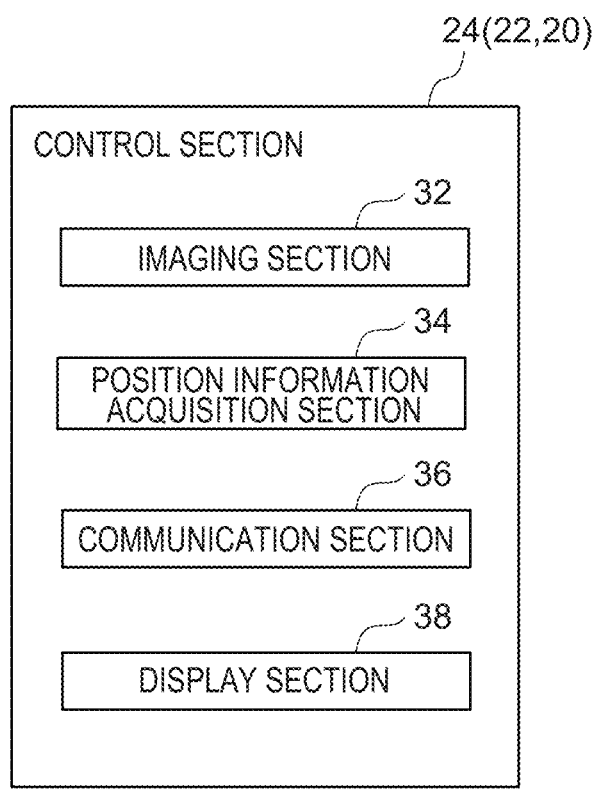
FIG. 3 is a block diagram illustrating relevant functional configuration of a smartphone control device installed to a smartphone.

The CPU 24A is a central processing unit that executes various programs and controls various sections. Namely, the CPU 24A reads a program from the ROM 24B and executes the program using the RAM 24C as a workspace. In the present exemplary embodiment, a program is stored in the ROM 24B. When the CPU 24A executes this program, the control section 24 of the smartphone control device 22 functions as an imaging section 32, a position information acquisition section 34, a communication section 36, and a display section 38, as illustrated in FIG. 3.

The ROM 24B stores various programs and various data. The RAM 24C acts as a workspace to temporary store a program or data. The storage 24D is configured by a hard disk drive (HDD) or a solid state drive (SSD), and stores various programs including an operating system, as well as a map database and the like. The communication I/F 24E includes an interface for connecting the network N in order to communicate with the position locating device 82 of the information processing center 80. A communication protocol such as LTE or Wi-Fi (registered trademark) may be employed as this interface.

The input/output I/F 24F is an interface for communicating within the smartphone control device 22. The GPS device 26, the camera 28, and the user I/F 30 are connected to the control section 24 of the present exemplary embodiment through the input/output I/F 24F. Note that the GPS device 26, the camera 28, and the user I/F 30 may be directly connected to the bus 24G.

The GPS device 26 includes an antenna (not illustrated in the drawings) for receiving GPS signals in order to measure a current position of the smartphone 20. The camera 28 captures light entering through a lens with an imaging element, thereby converting this light into image data. The user I/F 30 includes a display 30A configuring a display section, and a non-illustrated speaker. The display 30A is for example configured by a capacitance-type touch panel. The user I/F 30 corresponds to a "user interface" of the present disclosure.

As mentioned above, the smartphone control device 22 includes the imaging section 32, the position information acquisition section 34, the communication section 36, and the display section 38 illustrated in FIG. 3 as functional configuration. This functional configuration is implemented by the CPU 24A reading and executing the program stored in the ROM 24B.

The imaging section 32 has a function of implementing an "imaging step" of the present disclosure. Specifically, when a user of the smartphone 20 performs a predetermined operation on the smartphone control device 22 using the user I/F 30, the imaging section 32 has a function of capturing a surroundings image, this being an image of the surroundings of the smartphone 20, using the camera 28. The captured image is then stored in the storage 24D.

The position information acquisition section 34 has a function of implementing a "position information acquisition step". The position information acquisition section 34 attempts to acquire position information (i.e. a place name or the like) regarding a region predicted to be an imaging location of the surroundings image. The position information acquisition section 34 may for example ask the user of the smartphone 20 whether or not they are able to input position information regarding the region predicted to be the imaging location of the surroundings image. Specifically, the position information acquisition section 34 may display text such as "Can you input position information regarding the location of the surroundings image?" together with "Yes" and "No" buttons on the display of the user I/F 30. If the user selects "Yes", the position information acquisition section 34 may display text such as "Please input the name of your current position" on the display of the user I/F 30 together with a text box to input the place name. A place name input in the text box is then acquired as the position information. If the user selects "No", the processing by the position information acquisition section 34 is ended.

The communication section 36 has a function of communicating with the position locating device 82 of the information processing center 80 over the network N. in a case in which the position information acquisition section 34 has acquired position information regarding the imaging location of the surroundings image, the communication section 36 transmits data of the surroundings image captured by the imaging section 32 to the position locating device 82 of the information processing center 80 together with this position information. in a case in which the position information acquisition section 34 has not acquired position information regarding the imaging location of the surroundings image, the communication section 36 only transmits the surroundings image data to the position locating device 82 of the information processing center 80. The communication section 36 then receives information regarding the current position of the smartphone 20 from the position locating device 82.

The display section 38 has a function of displaying the current position of the smartphone 20 on the display of the user I/F 30. The display section 38 may for example display an image of a map on the display, and display the current position of the smartphone 20 in the form of an icon or the like on the map. When the GPS device 26 is in an in-range state for GPS signal reception, the display section 38 displays the current position of the smartphone 20 as measured by the GPS device 26 on the display. When the GPS device 26 is in an out-of-range state for GPS signal reception, the display section 38 is able to display the current position of the smartphone 20 on the display as received from the position locating device 82 of the information processing center 80 through the communication section 36. Note that the method of displaying the current position by the display section 38 may be modified as appropriate.

Configuration of Walking Robot

Figure 4:
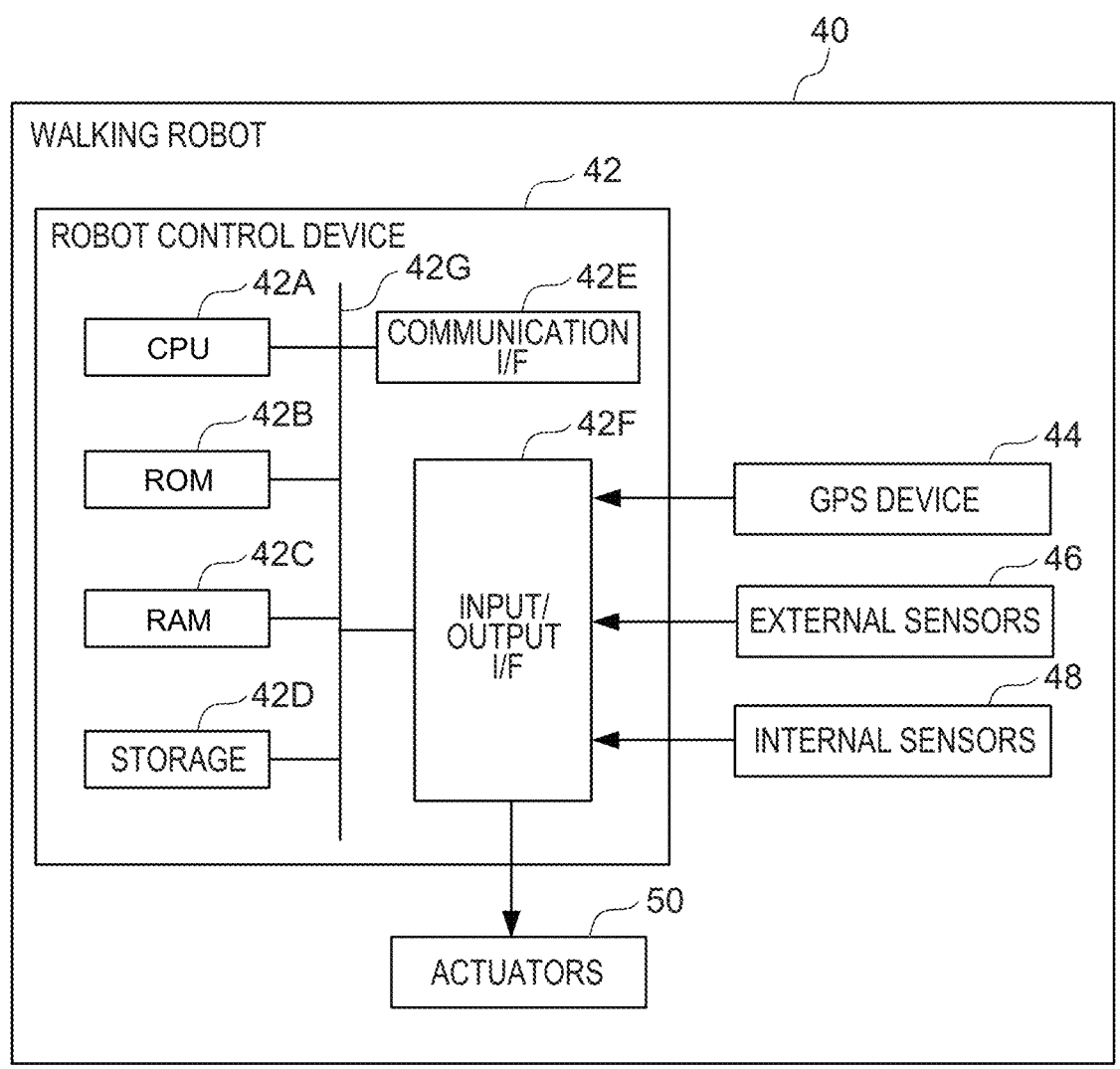
FIG. 4 is a block diagram illustrating relevant hardware configuration of a walking robot of the first exemplary embodiment.

FIG. 4 is a block diagram illustrating relevant hardware configuration of the walking robot 40. The walking robot 40 includes the robot control device 42, a GPS device 44, external sensors 46, internal sensors 48, and actuators 50.

The robot control device 42 is configured including a CPU 42A, ROM 42B, RAM 42C, storage 42D, a communication I/F 42E, and an input/output I/F 42F. The CPU 42A, the ROM 42B, the RAM 42C, the storage 42D, the communication I/F 42E, and the input/output I/F 42F are connected so as to be capable of communicating with each other through a bus 42G. Functionality of the CPU 42A, the ROM 42B, the RAM 42C, the storage 42D, the communication I/F 42E, and the input/output I/F 42F is the same as the functionality of the CPU 24A, the ROM 24B, the RAM 24C, the storage 24D, the communication I/F 24E, and the input/output I/F 24F of the control section 24 of the smartphone 20 described previously.

The CPU 42A reads a program from the storage 42D and executes the program using the RAM 42C as a workspace. The robot control device 42 thereby generates an action plan to cause the walking robot 40 to act. The action plan includes a walking plan to cause the walking robot 40 to walk. The walking plan is generated using a map database and so on stored in the storage 42D. The GPS device 44, the external sensors 46, the internal sensors 48, and the actuators 50 are connected to the input/output I/F 42F of the robot control device 42. Note that the GPS device 44, the external sensors 46, the internal sensors 48, and the actuators 50 may be directly connected to the bus 42G.

Functionality of the GPS device 44 is the same as that of the GPS device 26 of the smartphone 20, such that a current position of the walking robot 40 is measured using signals from GPS satellites. The external sensors 46 are a set of sensors for detecting surroundings information regarding the surroundings of the walking robot 40. The external sensors 46 include a camera (not illustrated in the drawings) for imaging the surroundings of the walking robot 40. The camera includes at least one camera out of a monocular camera, a stereo camera, or a 360-degree camera. Note that the external sensors 46 may include a millimeter-wave radar unit that transmits search waves over a predetermined range in the surroundings of the walking robot 40 and receives reflected waves, a laser imaging detection and ranging (LIDAR) unit that scans the predetermined range, or the like. The internal sensors 48 are a set of sensors that detect states of respective sections of the walking robot 40. The actuators 50 include plural electrical actuators that drive respective sections of the walking robot 40.

Figure 5:
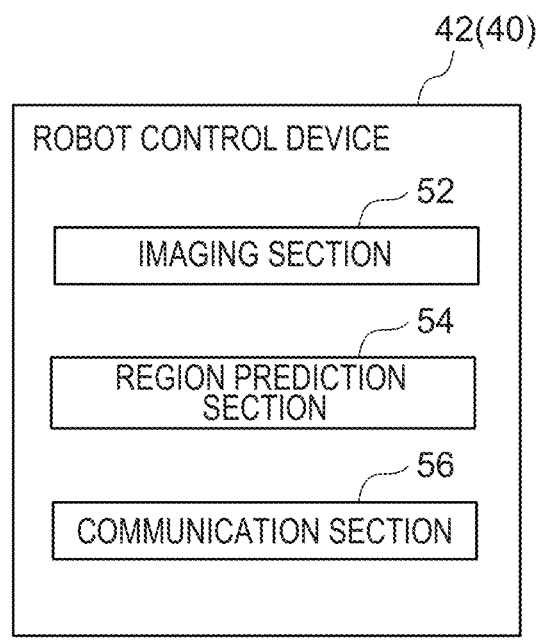
FIG. 5 is a block diagram illustrating relevant functional configuration of a robot control device installed to a walking robot.

FIG. 5 is a block diagram illustrating relevant functional configuration of the robot control device 42. As illustrated in FIG. 5, the robot control device 42 includes an imaging section 52, a region prediction section 54, and a communication section 56 as functional configuration. This functional configuration is implemented by the CPU 42A reading and executing a program stored in the ROM 42B.

The imaging section 52 has a function of implementing the "imaging step" of the present disclosure. Specifically, in a case in which the GPS device 44 transitions from an in-range state to an out-of-range state for GPS signal reception, the imaging section 52 has a function of actuating the camera of the external sensors 46 so as to capture an image of the surroundings of the walking robot 40 (i.e. the surroundings of the robot control device 42). The captured image is then stored in the storage 42D.

The region prediction section 54 has a function of implementing a "region prediction step". Specifically, in a case in which the GPS device 44 transitions from an in-range state to an out-of-range state for GPS signal reception, the region prediction section 54 employs a GPS signal reception history of the GPS device 44 to predict a region that has the potential to include the current position of the walking robot 40. For example, the region prediction section 54 predicts a circular region with a predetermined radius (such as a radius of several tens of meters) centered on the position where the GPS device 44 last received a GPS signal as a region that has the potential to include the current position of the walking robot 40.

The communication section 56 has a function of communicating with the position locating device 82 of the information processing center 80 over the network N. The communication section 56 transmits captured image data from the external sensors 46 to the position locating device 82, and receives current position information regarding the walking robot 40 from the position locating device 82.

Vehicle Configuration

Figure 6:
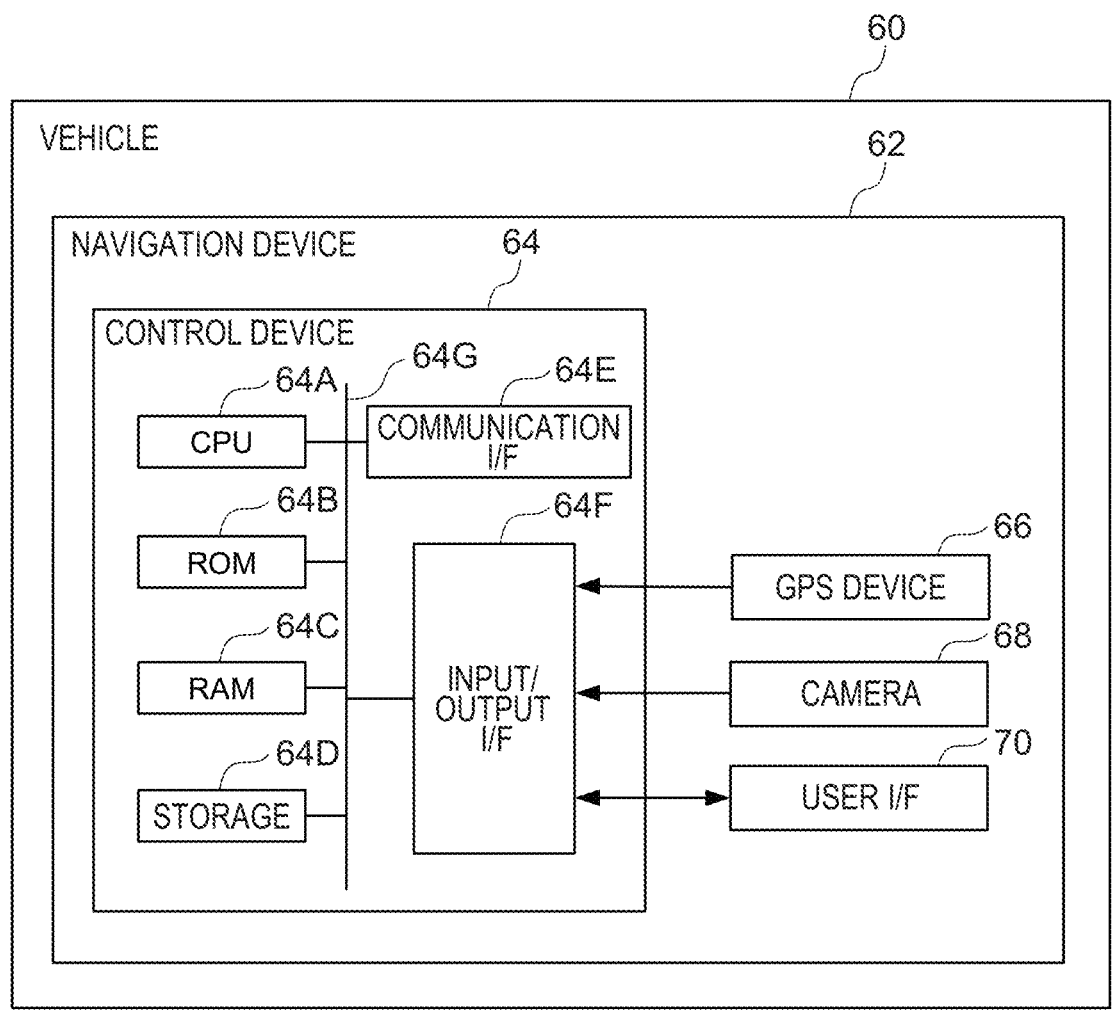
FIG. 6 is a block diagram illustrating relevant hardware configuration of a vehicle of the first exemplary embodiment.

As an example, the vehicle 60 is a manually driven vehicle. FIG. 6 is a block diagram illustrating relevant hardware configuration of the navigation device 62 installed to the vehicle 60. The navigation device 62 includes a control section 64, a GPS device 66, a camera 68, and a user I/F 70.

The control section 64 is configured including a CPU 64A, ROM 64B, RAM 64C, storage 64D, a communication I/F 64E and an input/output I/F 64F. The CPU 64A, the ROM 64B, the RAM 64C, the storage 64D, the communication I/F 64E, and the input/output I/F 64F are connected so as to be capable of communicating with each other through a bus 64G. Functionality of the CPU 64A, the ROM 64B, the RAM 64C, the storage 64D, the communication I/F 64E, and the input/output I/F 64F is the same as the functionality of the CPU 24A, the ROM 24B, the RAM 24C, the storage 24D, the communication I/F 24E, and the input/output I/F 24F of the control section 24 of the smartphone 20 described previously.

The CPU 64A reads a program from the storage 64D and executes the program using the RAM 64C as a workspace. The GPS device 66, the camera 68, and the user I/F 70 are connected to the input/output I/F 64F. Note that the GPS device 66, the camera 68, and the user I/F 70 may be directly connected to the bus 64G. Functionality of the GPS device 66 is the same as the functionality of the GPS device 26 of the smartphone 20, such that a current position of the vehicle 60 (i.e. the navigation device 62) is measured using GPS signals. The camera 68 is a monocular camera that images the surroundings of the vehicle 60 (such as ahead of the vehicle 60). Note that the camera 68 may be a stereo camera or a 360-degree camera. The user I/F 70 for example includes a display configuring a display section and a speaker configuring an audio output section (neither of which are illustrated in the drawings). The display may for example by configured by a capacitance-type touch panel.

Figure 7:
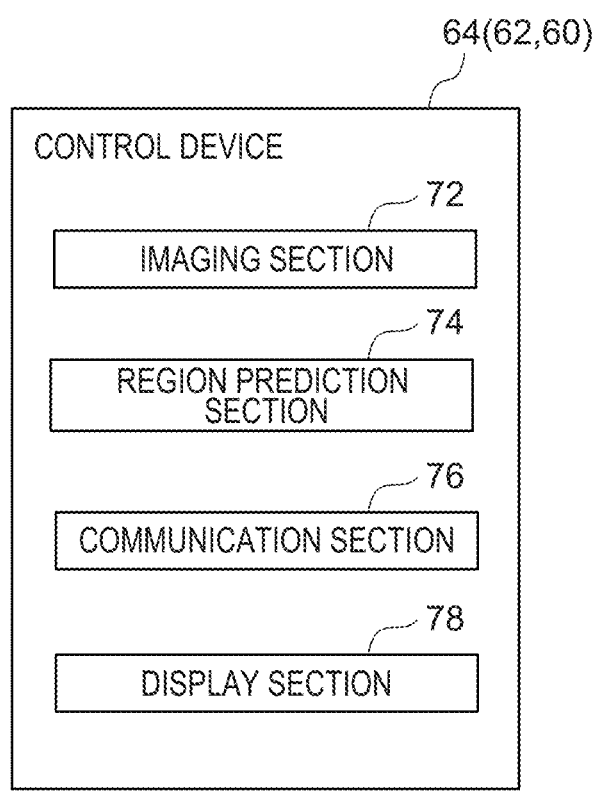
FIG. 7 is a block diagram illustrating relevant functional configuration of a navigation device installed to a vehicle.

FIG. 7 is a block diagram illustrating relevant functional configuration of the control section 64. The control section 64 includes an imaging section 72, a region prediction section 74, a communication section 76, and a display section 78 as functional configuration. This functional configuration is implemented by the CPU 64A reading and executing a program stored in the ROM 64B.

The imaging section 72 has a function of implementing the "imaging step" of the present disclosure. Specifically, in a case in which the GPS device 66 transitions from an in-range state to an out-of-range state for GPS signal reception, the imaging section 72 has a function of capturing a surroundings image, this being an image of the surroundings of the vehicle 60, using the camera 68. The captured surroundings image is then stored in the storage 64D.

The region prediction section 74 has a function of implementing the "region prediction step". Specifically, in a case in which the GPS device 66 transitions from an in-range state to an out-of-range state for GPS signal reception, the region prediction section 74 employs a GPS signal reception history of the GPS device 66 to predict a region that has the potential to include the current position of the vehicle 60. For example, the region prediction section 74 predicts a circular region with a predetermined radius (such as a radius of several hundred meters) centered on the site where the GPS device 66 last received a GPS signal as a region that has the potential to include the current position of the vehicle 60.

The communication section 76 has a function of communicating with the position locating device 82 of the information processing center 80 over the network N. The communication section 76 transmits data of the surroundings image captured by the imaging section 72 together with information regarding the predicted region as predicted by the region prediction section 74 (hereafter also referred to as "predicted region information") to the position locating device 82, and receives current position information regarding the vehicle 60 from the position locating device 82.

The display section 78 has a function of displaying the current position of the vehicle 60 on the display of the user I/F 70. The display section 78 may for example display an image of a map on the display, and display the current position of the vehicle 60 in the form of an icon or the like on the map. When the GPS device 66 is in an in-range state for GPS signal reception, the display section 78 displays the current position of the vehicle 60 as measured by the GPS device 66 on the display. When the GPS device 66 is in an out-of-range state for GPS signal reception, the display section 78 displays the current position of the vehicle 60 on the display as received from the position locating device 82 of the information processing center 80 through the communication section 76.

Information Processing Center

Figure 8:
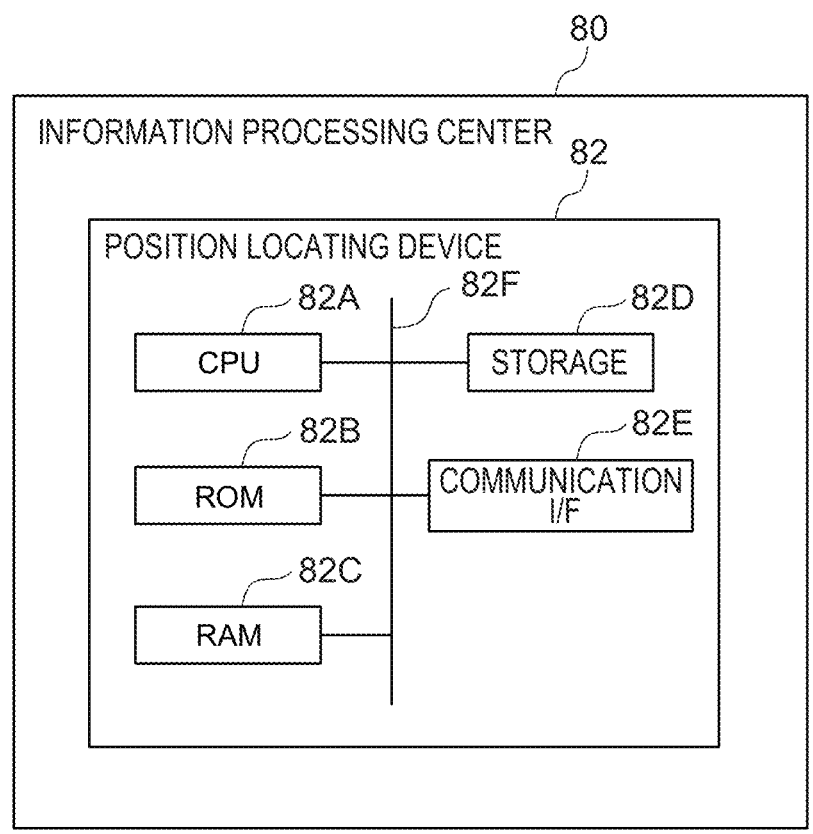
FIG. 8 is a block diagram illustrating relevant hardware configuration of an information processing center of the first exemplary embodiment.

FIG. 8 is a block diagram illustrating relevant hardware configuration of the information processing center 80. As illustrated in FIG. 8, the information processing center 80 includes the position locating device 82. The position locating device 82 is configured including a CPU 82A, ROM 82B, RAM 82C, storage 82D, and a communication I/F 82E. The CPU 82A, the ROM 82B, the RAM 82C, the storage 82D, and the communication I/F 82E are connected so as to be capable of communicating with each other through a bus 82G. Functionality of the CPU 82A, the ROM 82B, the RAM 82C, the storage 82D, and the communication I/F 82E is the same as the functionality of the CPU 20A, the ROM 20B, the RAM 20C, the storage 20D, and the communication I/F 20E of the smartphone 20 described previously.

Figure 9:
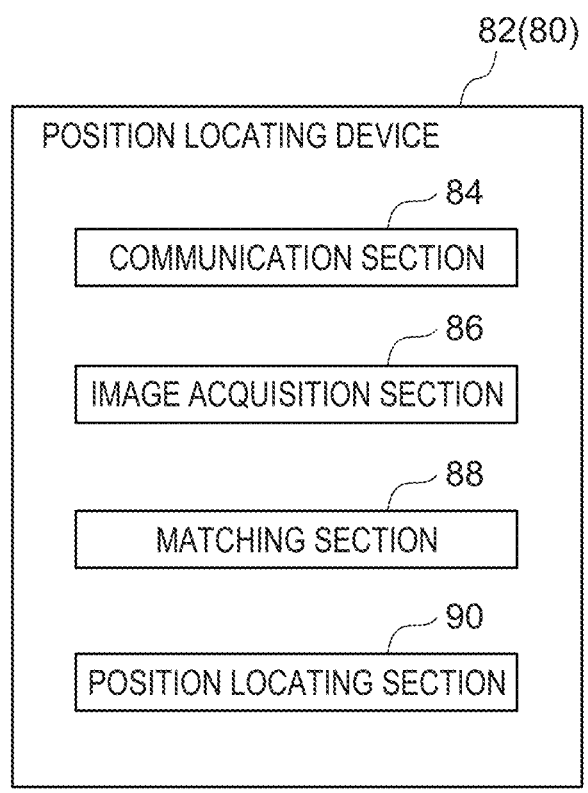
FIG. 9 is a block diagram illustrating relevant functional configuration of a position locating device provided at an information processing center.

The CPU 82A reads a program from the storage 82D and executes the program using the RAM 82C as a workspace. The position locating device 82 thereby functions as a worldwide web (WWW) server. The position locating device 82 is configured including a search engine. When the CPU 82A executes the program, the position locating device 82 functions as a communication section 84, an image acquisition section 86, a matching section 88, and a position locating section 90, as illustrated in FIG. 9.

The communication section 84 has a function of communicating with the smartphone control device 22 of the smartphone 20, the robot control device 42 of the walking robot 40, and the navigation device 62 of the vehicle 60 over the network N. The communication section 84 also has a function of receiving image data and position information or predicted region information from the smartphone control device 22, the robot control device 42, and the navigation device 62.

The image acquisition section 86 has a function of implementing an "image acquisition step" of the present disclosure. Specifically, the image acquisition section 86 uses its WWW server functionality to gather images that are similar to a surroundings image received through the communication section 84. Each of the images acquired by the image acquisition section 86 is an image associated (i.e. held in a unique association) with position information regarding its imaging location. For example, in a case in which the communication section 84 receives position information (such as place name information) together with a surroundings image from the smartphone control device 22, the image acquisition section 86 gathers images associated with this position information from a site via the network N. As another example, in a case in which the communication section 84 receives predicted region information together with a surroundings image from the robot control device 42 or the navigation device 62, the image acquisition section 86 acquires images associated with position information within the region corresponding to the predicted region information from a site via the network N.

The matching section 88 has a function of implementing a "matching step" of the present disclosure. Specifically, the matching section 88 has a function of performing image matching between a surroundings image and images acquired by the image acquisition section 86. This image matching may take the form of area-based image matching (template matching) or feature-based image matching. Area-based image matching is a technique in which image data is superimposed as-is. In area-based image matching, a pattern corresponding to a target object is expressed as an image (what is referred to as a template image) and this template image is moved around within a search range to find the location that is most similar. Feature-based image matching is a technique involving superimposition of an image structure, namely levels representing positional relationships between feature points extracted from an image. In feature-based image matching, first, edges and feature points are extracted from an image, and the shapes and spatial positional relationships thereof are expressed as a line drawing. Superimposition is then performed based on similarities in structures between line drawings. The matching section 88 performs this image matching to find a single image that is a match for the surroundings image.

The position locating section 90 has a function of implementing a "position locating step" of the present disclosure. The position locating section 90 locates (identifies) the current position of the smartphone 20, walking robot 40, or vehicle 60 using the position information associated with the single image found by the matching section 88. Specifically, the position locating section 90 locates (specifies) the imaging location of the single image found by the matching section 88 as the current position of the smartphone 20, walking robot 40, or vehicle 60. On locating the current position or the smartphone 20, walking robot 40, or vehicle 60, the position locating section 90 transmits information regarding the thus located current position to the corresponding smartphone control device 22, robot control device 42, or navigation device 62 through the communication section 84.

Control Flow

Explanation follows regarding flows of control processing respectively implemented by the smartphone control device 22, the robot control device 42, the navigation device 62, and the position locating device 82, with reference to FIG. 10 to FIG. 13.

Flow of Control by Smartphone

Figure 10:
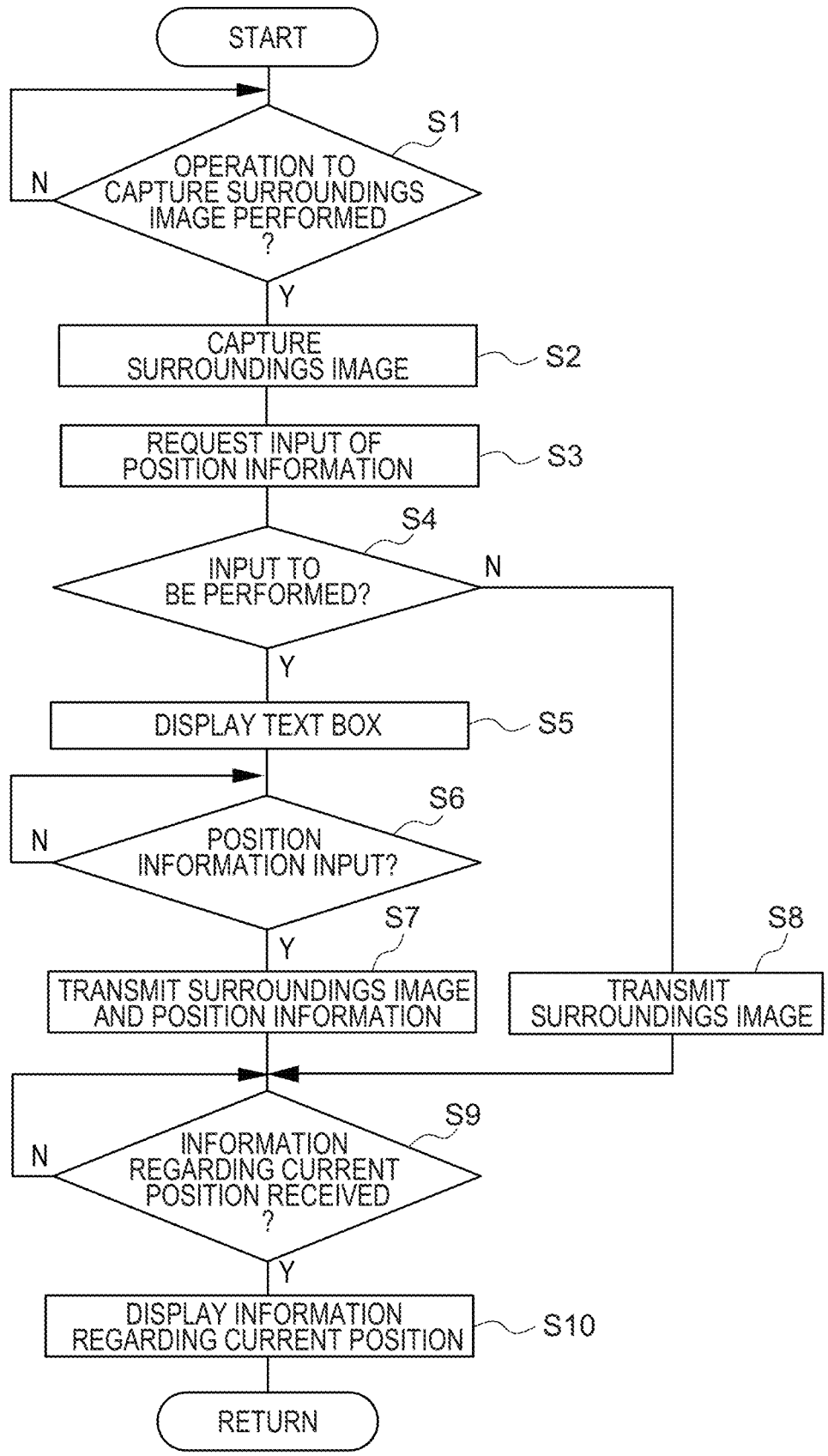
FIG. 10 is a flowchart illustrating an example of a flow of control processing implemented by a smartphone control device.

In the smartphone control device 22 of the smartphone 20, if for example a state arises in which the GPS device 26 is unable to receive GPS signals, the CPU 24A starts the control processing illustrated in FIG. 10. In this control processing, first, at step S1, the CPU 24A determines based on a signal from the user I/F 30 whether or not the user of the smartphone 20 has performed an operation to capture a surroundings image. in a case in which this determination is affirmative, processing transitions to the next step S2.

At step S2, the CPU 24A employs the functionality of the imaging section 32 to capture a surroundings image from the smartphone 20 using the camera 28. Next, at step S3, the CPU 24A employs the functionality of the position information acquisition section 34 to display text such as "Can you input position information regarding the location of the surroundings image?" together with "Yes" and "No" buttons on the display of the user I/F 30. Next, at step S4, the CPU 24A determines which out of the "Yes" or "No" buttons has been selected. in a case in which the "Yes" button has been selected, processing transitions to step S5. in a case in which the "No" button has been selected, processing transitions to step S8.

in a case in which processing has transitioned to step S5, the CPU 24A displays text such as "Please input a place name for your current position", together with a text box to input the place name, on the display of the user I/F 30. Next, at step S6, the CPU 24A determines whether or not a place name, namely position information, has been input to the text box. in a case in which this determination is affirmative, processing transitions to step S7. At step S7, the CPU 24A employs the functionality of the communication section 36 to transmit the position information and the surroundings image to the position locating device 82.

in a case in which determination is negative at step S4 and processing has transitioned to step S8, the CPU 24A employs the functionality of the communication section 36 to transmit only the surroundings image to the position locating device 82. When the processing of step S8 is complete, processing transitions to step S9.

At step S9, the CPU 24A determines whether or not information regarding the current position of the smartphone 20 has been received from the position locating device 82. in a case in which this determination is affirmative, processing transitions to the next step S10. At step S10, the CPU 24A employs the functionality of the display section 38 to display information regarding the current position of the smartphone 20 on the display of the user I/F 30. When the processing of step S10 is complete, processing returns to step S1 and the above-described processing is repeated.

Flow of Control by Walking Robot

Figure 11:
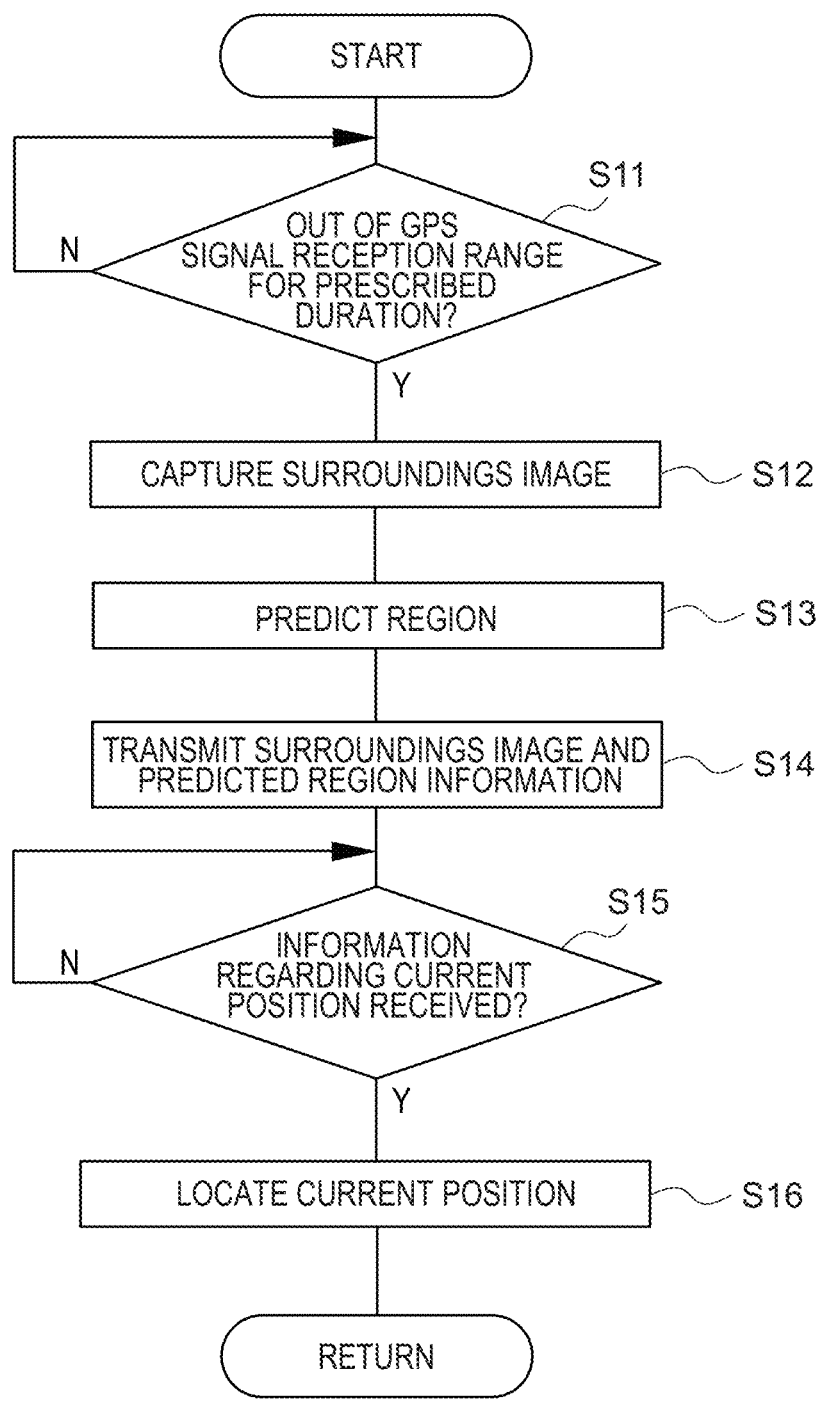
FIG. 11 is a flowchart illustrating an example of a flow of control processing implemented by a robot control device.

In the robot control device 42 of the walking robot 40, if for example a state arises in which the GPS device 44 is unable to receive GPS signals, the CPU 42A starts the control processing illustrated in FIG. 11. In this control processing, first, at step S11, the CPU 42A determines based on a signal from the GPS device 44 whether or not a prescribed duration has elapsed since the GPS device 44 became unable to receive GPS signals. in a case in which this determination is affirmative, processing transitions to the next step S12.

At step S12, the CPU 42A employs the functionality of the imaging section 32 to capture a surroundings image from the walking robot 40 using the camera of the external sensors 46. Next, at step S13, the CPU 42A employs the functionality of the region prediction section 54 to predict a region that has the potential to include the current position of the walking robot 40 based on the GPS signal reception history of the GPS device 44. Next, at step S14, the CPU 42A employs the functionality of the communication section 56 to transmit the surroundings image and the predicted region information to the position locating device 82.

Next, at step S15, the CPU 42A determines whether or not information regarding the current position of the walking robot 40 has been received from the position locating device 82. in a case in which this determination is affirmative, processing transitions to the next step S16. At step S16, the CPU 42A locates (recognizes) the current position of the walking robot 40 based on the information received from the position locating device 82. When the processing of step S16 is complete, processing returns to step S11 and the above-described processing is repeated.

Flow of Control by Vehicle

Figure 12:
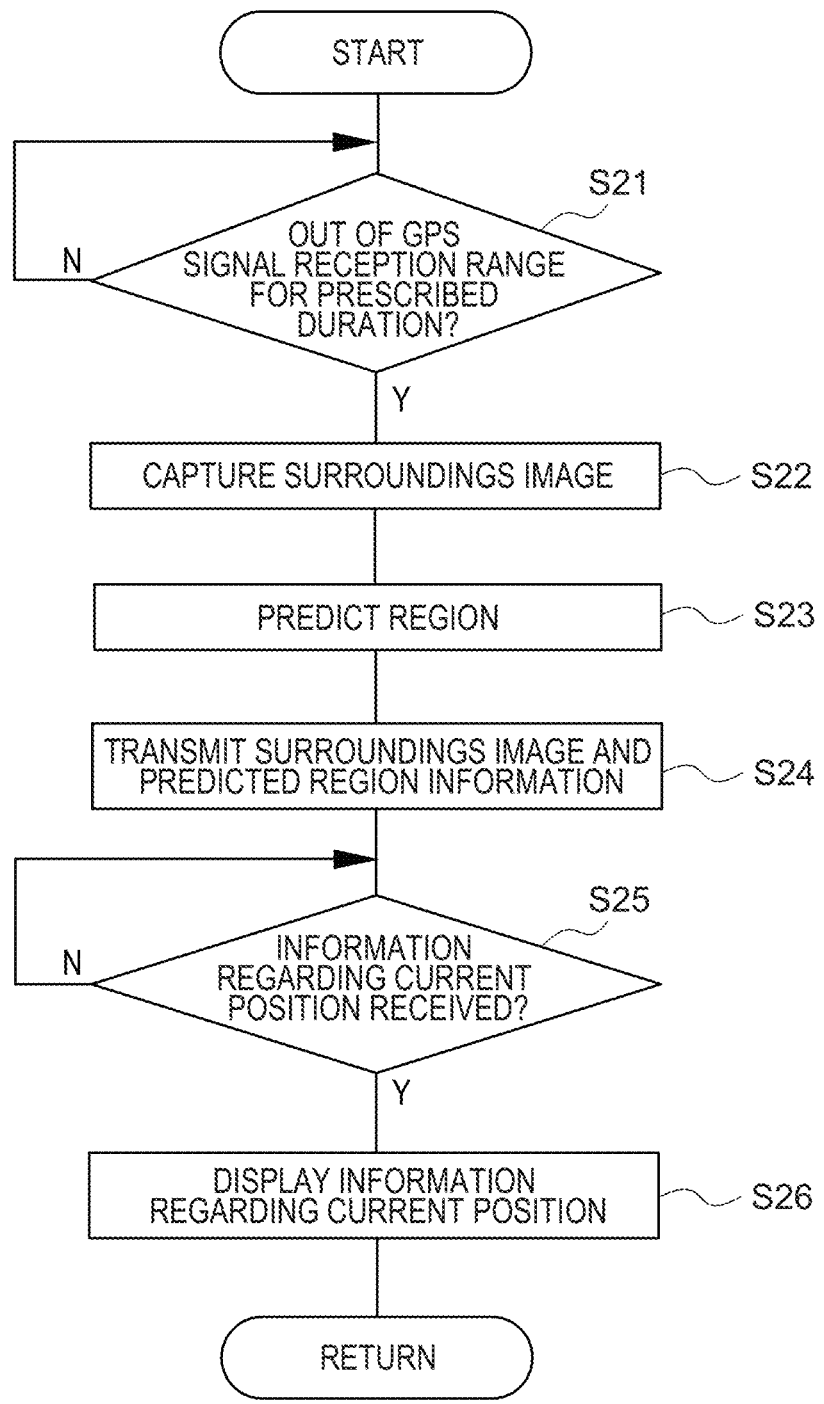
FIG. 12 is a flowchart illustrating an example of a flow of control processing implemented by a navigation device.

In the navigation device 62 of the vehicle 60, if for example a state arises in which the GPS device 66 is unable to receive GPS signals, the CPU 64A starts the control processing illustrated in FIG. 12. In this control processing, first, at step S21, the CPU 64A determines based on a signal from the GPS device 66 whether or not a prescribed duration has elapsed since the GPS device 66 became unable to receive GPS signals. in a case in which this determination is affirmative, processing transitions to the next step S22.

At step S22, the CPU 64A employs the functionality of the imaging section 72 to capture a surroundings image from the vehicle 60 using the camera 68. Next, at step S23, the CPU 64A employs the functionality of the region prediction section 74 to predict a region that has the potential to include the current position of the vehicle 60 based on the GPS signal reception history of the GPS device 66. Next, at step S24, the CPU 64A employs the functionality of the communication section 76 to transmit the surroundings image and the predicted region information to the position locating device 82.

Next, at step S25, the CPU 64A determines whether or not information regarding the current position of the vehicle 60 has been received from the position locating device 82. in a case in which this determination is affirmative, processing transitions to the next step S26. At step S26, the CPU 64A employs the functionality of the display section 78 to display the information regarding the current position of the vehicle 60 on the display of the user I/F 70. When the processing of step S26 is complete, processing returns to step S21 and the above-described processing is repeated.

Flow of Processing by Information Processing Center

Figure 13:
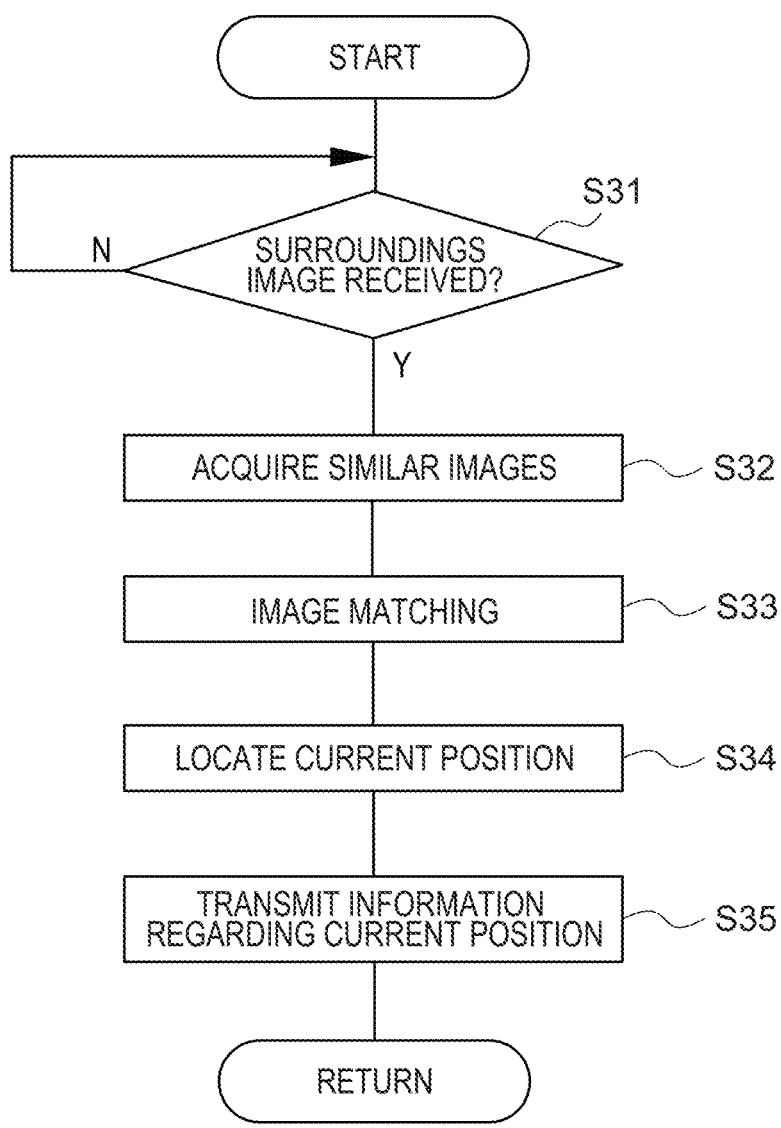
FIG. 13 is a flowchart illustrating an example of a flow of control processing implemented by a position locating device.

As illustrated in FIG. 13, in the position locating device 82 of the information processing center 80, first, at step S31, the CPU 82A determines whether or not a surroundings image has been received from the smartphone control device 22, the robot control device 42, or the navigation device 62. in a case in which this determination is affirmative, processing transitions to the next step S32.

At step S32, the CPU 82A employs the functionality of the image acquisition section 86 to acquire images that are similar to the surroundings image and are associated with position information regarding the imaging location from a site over the network N. At this step, in a case in which the communication section 84 has received position information together with the surroundings image from the smartphone control device 22, the CPU 82A gathers images associated with this position information from a site over the network N. in a case in which the communication section 84 has received predicted region information together with the surroundings image from either the robot control device 42 or the navigation device 62, the CPU 82A acquires images associated with position information within the region corresponding to the predicted region information from the site over the network N.

Next, at step S33, the CPU 82A employs the functionality of the matching section 88 to perform image matching between the surroundings image and the images acquired by the image acquisition section 86 so as to find a single image that is a match for the surroundings image. Next, at step S34, the CPU 82A employs the functionality of the position locating section 90 to locate the current position of the smartphone 20, walking robot 40, or vehicle 60 from the position information associated with the single image found by the matching section 88. Next, at step S35, the CPU 82A employs the functionality of the communication section 84 to transmit the located current position to the smartphone control device 22, robot control device 42, or navigation device 62 over the network N. When the processing of step S35 is complete, processing returns to step S31 and the above-described processing is repeated.

SUMMARY OF PRESENT EXEMPLARY EMBODIMENT

In the position locating system 10 according to the present exemplary embodiment, images similar to a surroundings image from a mobile terminal (either the smartphone 20, the robot control device 42, or the navigation device 62) and associated with position information regarding the imaging location are acquired over the network N as described above. Image matching between the surroundings image and the acquired images is then performed, a single image that is a match for the surroundings image is found, and the current position of the mobile terminal is located from the position information associated with this single image. This enables the current position to be located without employing radio waves from a dedicated transmitter, thereby enabling accurate position locating to be secured in regions that cannot be reached by GPS signals, without the need to install dedicated transmitters.

Moreover, in the present exemplary embodiment, in a case in which the GPS devices 44, 66 have transitioned from an in-range state to an out-of-range state for GPS signal reception, the region prediction sections 54, 74 of the robot control device 42 and the navigation device 62 employ the GPS signal reception histories of the GPS devices 44, 66 to predict respective regions that have the potential to include the current positions of the robot control device 42 and the navigation device 62. The image acquisition section 86 of the position locating device 82 then acquires images associated with the position information within the regions predicted by the region prediction sections 54, 74 over the network N. Performing prediction in this manner limits the target range in which the image acquisition section 86 searches for images over the network N, thereby improving image acquisition efficiency.

Moreover, in the present exemplary embodiment, for example when in a region that cannot be reached by GPS signals, the user of the smartphone 20 is able to input position information through the display of the user I/F 30. This position information may for example be approximate information regarding the current position (such as the name of the general area) as known by the user. The image acquisition section 86 of the position locating device 82 acquires images associated with the position information input to the user I/F 30 over the network N. This limits the target range in which the image acquisition section 86 searches for images over the network N, thereby improving image acquisition efficiency.

Moreover, in the present exemplary embodiment, in a case in which the GPS devices 44, 66 included in the robot control device 42 and the navigation device 62 are in an out-of-range state for GPS signal reception, the imaging sections 52, 72 capture respective surroundings images of the surroundings of the walking robot 40 and the vehicle 60 using the camera of the external sensors 46 and the camera 68. Image matching is then performed as described previously, and the current positions of the walking robot 40 and the vehicle 60 are located based on the results thereof. This enables the current positions of the walking robot 40 and the vehicle 60 to be located automatically.

Moreover, in the present exemplary embodiment, for example when in a region that cannot be reached by GPS signals, the user of the smartphone 20 performs a particular operation to cause the imaging section 32 to capture a surroundings image of the surroundings of the smartphone 20 using the camera 28. Image matching is then performed as described previously, and the current position of the smartphone 20 is located based on the results thereof. This enables the user of the smartphone 20 to locate their current position as required.

Second Exemplary Embodiment

Next, explanation follows regarding a second exemplary embodiment of the present disclosure. Note that configuration and operation that are basically the same as those in the first exemplary embodiment are allocated the same reference numerals as in the first exemplary embodiment, and explanation thereof is omitted.

Figure 14:
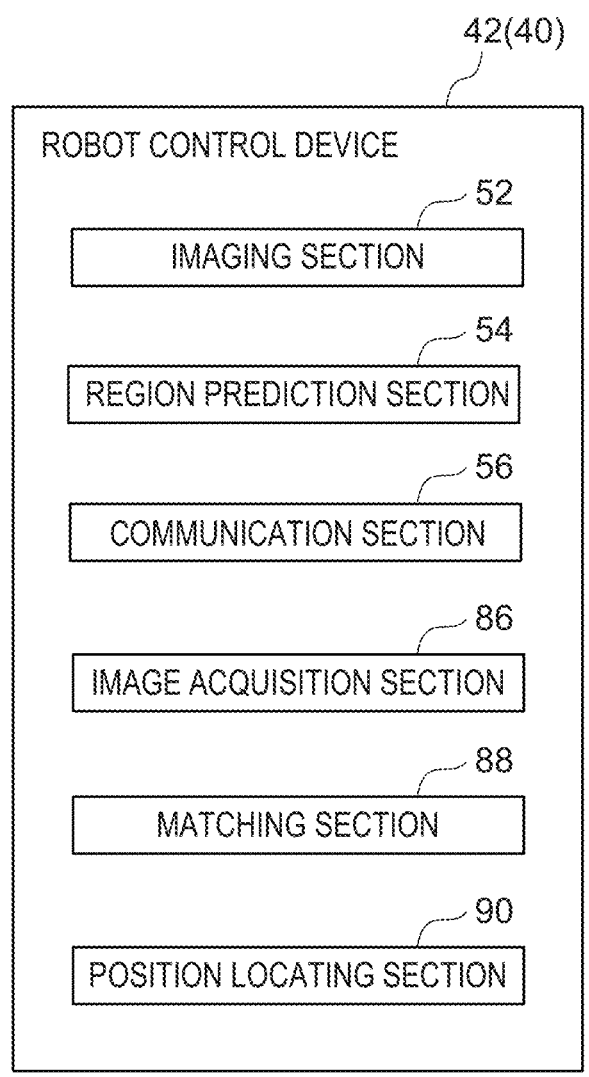
FIG. 14 is a block diagram illustrating relevant functional configuration of a robot control device installed to a walking robot of a second exemplary embodiment.

In the second exemplary embodiment of the present disclosure, a position locating program is stored in the ROM 42B of the robot control device 42 of the walking robot 40. This position locating program is a program for implementing the position locating method according to the present disclosure. When the CPU 42A (processor) of the robot control device 42 executes this position locating program, the robot control device 42 functions as the imaging section 52, the region prediction section 54, the communication section 56, the image acquisition section 86, the matching section 88, and the position locating section 90, as illustrated in FIG. 14.

Similarly to in the first exemplary embodiment, the imaging section 52 has a function of implementing the "imaging step" of the present disclosure. in a case in which the GPS device 44 has transitioned from an in-range state to an out-of-range state for GPS signal reception, the imaging section 52 causes the camera of the external sensors 46 to operate so as to capture a surroundings image of the surroundings of the walking robot 40 (i.e. the surroundings of the robot control device 42).

Similarly to in the first exemplary embodiment, the region prediction section 54 has a function of implementing the "region prediction step". in a case in which the GPS device 44 has transitioned from an in-range state to an out-of-range state for GPS signal reception, the region prediction section 54 employs the GPS signal reception history of the GPS device 44 to predict a region that has the potential to include the current position of the walking robot 40.

The communication section 56 has a function of communicating with the position locating device 82 of the information processing center 80 over the network N. The communication section 56 transmits the surroundings image data and predicted region information to the position locating device 82.

Similarly to in the first exemplary embodiment, the image acquisition section 86 has a function of implementing the "image acquisition step" of the present disclosure. However, in the present exemplary embodiment, the image acquisition section 86 issues an image search request to the position locating device 82 of the information processing center 80 via the communication section 56. The request is to search for images that are images similar to the surroundings image and associated with the position information regarding the imaging location. The request specifies a search range corresponding to a range within the region indicated by the predicted region information.

Similarly to in the first exemplary embodiment, the matching section 88 has a function of implementing the "matching step" of the present disclosure. The matching section 88 performs image matching between the surroundings image and the images acquired by the image acquisition section 86 so as to find a single image that is a match for the surroundings image.

Similarly to in the first exemplary embodiment, the position locating section 90 has a function of implementing the "position locating step" of the present disclosure. The position locating section 90 locates the current position of the walking robot 40 from the position information associated with the single image found by the matching section 88.

In the present exemplary embodiment, the CPU 42A performs similar processing to steps S11 to S13 and S16 illustrated in FIG. 11; however, at step S14, in addition to transmitting the surroundings image and the predicted region information to the position locating device 82 of the information processing center 80, the CPU 42A also requests the above-described image search. Moreover, instead of performing step S15 between step S14 and step S16 as illustrated in FIG. 11, the CPU 42A performs processing similar to that of steps S32, S33 illustrated in FIG. 13. Other configuration of the present exemplary embodiment is similar to that in the first exemplary embodiment. The present exemplary embodiment therefore obtains similar operation and advantageous effects to those in the first exemplary embodiment.

SUPPLEMENTARY EXPLANATION OF EXEMPLARY EMBODIMENTS

Although the second exemplary embodiment describes a case in which the robot control device 42 of the walking robot 40 executes the position locating program, a position locating program may be executed by the navigation device 62 of the vehicle 60. In such cases, the control section 64 of the navigation device 62 functions as the imaging section 72, the region prediction section 74, the communication section 76, the display section 78, the image acquisition section 86, the matching section 88, and the position locating section 90.

Although the navigation device 62 is installed to the vehicle 60 in the above exemplary embodiments, the navigation device 62 may take the form of a portable terminal (such as a smartphone or a tablet) that can be carried on and off the vehicle 60.

Note that respective processing executed by the CPUs 24A, 42A, 64A, 82A reading and executing software (programs) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The respective processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the above exemplary embodiments, the programs are in a format pre-stored (installed) in a computer-readable non-transitory recording medium. For example, the program of the position locating device 82 is pre-stored in the storage 82D. However, there is no limitation thereto, and the programs may be provided in a format recorded on a non-transitory recording medium such as compact disc read only memory (CD-ROM), digital versatile disc read only memory (DVD-ROM), or universal serial bus (USB) memory. Alternatively, the respective programs may be provided in a format downloadable from an external device over a network.

The flows of control processing explained in the above exemplary embodiments are merely examples, and superfluous steps may be omitted, new steps may be added, or the processing sequence may be changed within a range not departing from the spirit of the present disclosure.

What is claimed is:

1. A position locating system for locating a current position of a mobile terminal, the position locating system comprising:
   an imaging section configured to capture a surroundings image of surroundings of the mobile terminal using a camera provided at the mobile terminal;
   an image acquisition section configured to acquire, over a network, images similar to the surroundings image and associated with position information regarding an imaging location;
   a matching section configured to perform image matching between the surroundings image and the images acquired by the image acquisition section so as to find a single image that is a match for the surroundings image;
   a position locating section configured to locate the current position from the position information associated with the single image; and
   a region prediction section configured to employ a signal reception history of a GPS device provided at the mobile terminal to predict a region that has potential to include the current position in a case in which the GPS device has transitioned from an in-range state for GPS satellite signal reception to an out-of-range state for GPS satellite signal reception,
   wherein the image acquisition section is configured to acquire, over the network, an image associated with position information within the region predicted by the region prediction section.

2. The position locating system of claim 1, wherein:
   the mobile terminal includes a user interface enabling a user of the mobile terminal to input position information; and
   the image acquisition section is configured to acquire, over the network, images associated with the position information input to the user interface.

3. The position locating system of claim 1, wherein:
   the mobile terminal is installed to a vehicle or a robot; and
   the imaging section is configured to perform imaging in a state in which a GPS device provided at the mobile terminal is in an out-of-range state for GPS satellite signal reception.

4. The position locating system of claim 1, wherein the imaging section is configured to perform imaging in response to user operation of the mobile terminal.

5. The position locating system of claim 1, wherein the region prediction section is configured to predict a circular region with a predetermined radius centered on a site where the GPS device last received a signal as the region that has potential to include the current position.

6. The position locating system of claim 3, wherein the imaging section is configured to perform imaging in a case in which a prescribed duration has elapsed since the GPS device became unable to receive a signal.

7. A position locating method for locating a current position of a mobile terminal, the position locating method comprising:
   capturing a surroundings image of surroundings of the mobile terminal using a camera provided at the mobile terminal;
   acquiring, over a network, images similar to the surroundings image and associated with position information regarding an imaging location;
   performing image matching between the surroundings image and the acquired images so as to find a single image that is a match for the surroundings image;
   locating the current position from the position information associated with the single image;
   employing a signal reception history of a GPS device provided at the mobile terminal to predict a region that has potential to include the current position in a case in which the GPS device has transitioned from an in-range state for GPS satellite signal reception to an out-of-range state for GPS satellite signal reception; and
   acquiring, over the network, an image associated with position information within the predicted region.

8. The position locating method of claim 7, wherein:
   the mobile terminal includes a user interface enabling a user of the mobile terminal to input position information; and
   images similar to the surroundings image and associated with the position information input to the user interface are acquired over the network.

9. The position locating method of claim 7, wherein:
   the mobile terminal is installed to a vehicle or a robot; and
   the surroundings image is captured in a state in which a GPS device provided at the mobile terminal is in an out-of-range state for GPS satellite signal reception.

10. The position locating method of claim 7, wherein the surroundings image is captured in response to user operation of the mobile terminal.

11. A position locating non-transitory computer readable medium for execution by a processor in order to locate a current position of a mobile terminal, the position locating program comprising:
    capturing a surroundings image of surroundings of the mobile terminal using a camera provided at the mobile terminal;
    acquiring, over a network, images similar to the surroundings image and associated with position information regarding an imaging location;
    performing image matching between the surroundings image and the acquired images so as to find a single image that is a match for the surroundings image;
    locating the current position from the position information associated with the single image;
    employing a signal reception history of a GPS device provided at the mobile terminal to predict a region that has potential to include the current position in a case in which the GPS device has transitioned from an in-range state for GPS satellite signal reception to an out-of-range state for GPS satellite signal reception; and
    acquiring, over the network, an image associated with position information within the predicted region.

12. The position locating non-transitory computer readable medium of claim 11, wherein:

the mobile terminal includes a user interface enabling a user of the mobile terminal to input position information; and images similar to the surroundings image and associated with the position information input to the user interface are acquired over the network.

13. The position locating non-transitory computer readable medium of claim 11, wherein:
the mobile terminal is installed to a vehicle or a robot; and
the surroundings image is captured in a state in which a GPS device provided at the mobile terminal is in an out-of-range state for GPS satellite signal reception.

14. The position locating non-transitory computer readable medium of claim 11, wherein the surroundings image is captured in response to user operation of the mobile terminal.

* * * * *